United States Patent
Lim et al.

(10) Patent No.: US 6,549,107 B2
(45) Date of Patent: Apr. 15, 2003

(54) LATCHING MECHANISM FOR MEMS ACTUATOR AND METHOD OF FABRICATION

(75) Inventors: Martin Lim, San Mateo, CA (US); Robert Fan, Canoga Park, CA (US); Long Que, San Jose, CA (US)

(73) Assignee: OpticNet, Inc.

( * ) Notice: Subject to any disclaimer, the term of this patent is extended or adjusted under 35 U.S.C. 154(b) by 0 days.

(21) Appl. No.: 09/793,307

(22) Filed: Feb. 26, 2001

(65) Prior Publication Data

US 2002/0118084 A1 Aug. 29, 2002

(51) Int. Cl.⁷ .............................................. H01H 51/22
(52) U.S. Cl. .......................................... 335/78; 257/421
(58) Field of Search ............................ 335/78; 257/414, 257/421, 431; 200/181

(56) References Cited

U.S. PATENT DOCUMENTS

| | | | | |
|---|---|---|---|---|
| 5,645,564 A | * | 7/1997 | Northrup et al. | ............ 606/205 |
| 6,114,794 A | * | 9/2000 | Dhuler et al. | ................ 310/307 |
| 6,303,885 B1 | * | 10/2001 | Hichwa et al. | ............. 200/181 |
| 6,360,036 B1 | * | 3/2002 | Couillard | ...................... 385/19 |

OTHER PUBLICATIONS

L. Que, et al., "Bent Beam Electro–Thermal Actuators For High Force Applications" IEEE Intl Workshop on Micro Electro Mechanical Systems (MEMS '99) Jan. 1999), pp. 31–36.

C. Marxer, et al., "A Variable Optical Attenuator Based on Silicon Micromechanics" IEEE Photon. Technol. Ltrs., vol. 11, No. 2, Feb. 1999, pp. 233–235.

B. Barber, et al. "A Fiber Connectorized MEMS Variable Optical Attenuator" IEEE Photon. Technol. Ltrs., vol. 10, Sep. 1998, pp. 1262–1264.

* cited by examiner

Primary Examiner—Lincoln Donovan
Assistant Examiner—Tuyen T. Nguyen
(74) Attorney, Agent, or Firm—Coudert Brothers LLP

(57) ABSTRACT

A latching mechanism for a MEMS actuator as, for example, a mirror in an N×N fiber optic switch, maintains a thermally actuated mirror in its actuated position even in the event of a power interruption by a pair of clamps, which clamp against an actuator arm. Such actuator arm is thermally actuated by a bent beam type of thermal actuator. To provide for effective fabrication using the MEMS technique (microelectromechanical system), on for example, a silicon substrate where the entire moveable structure is a suspended mechanism, the clamps are fabricated in a normally closed position. In this position they typically interfere with the line of motion of an enlarged portion of an actuator arm being directly in the line of motion or with a post and slot technique.

7 Claims, 3 Drawing Sheets

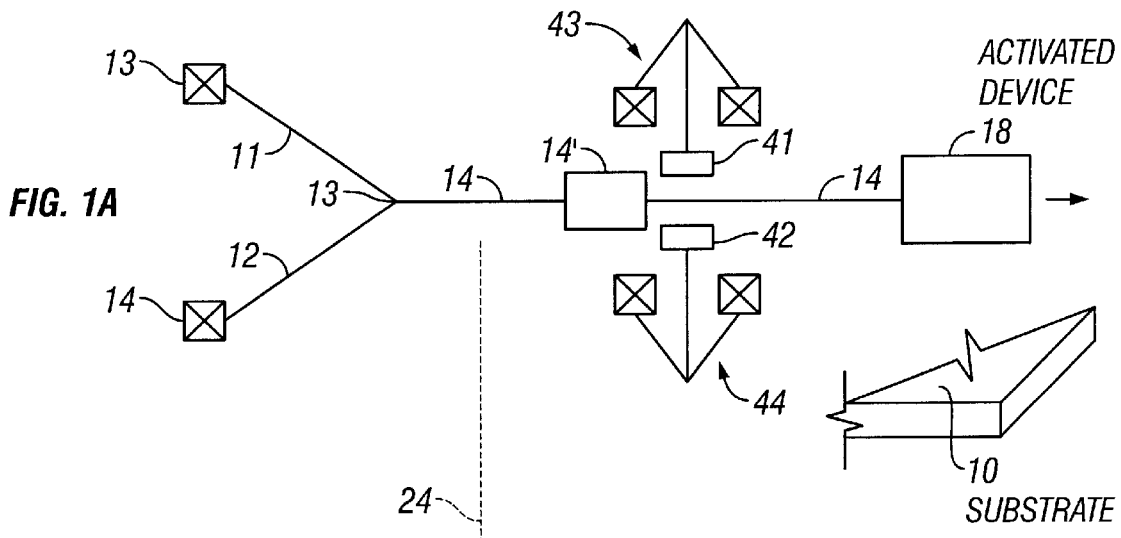
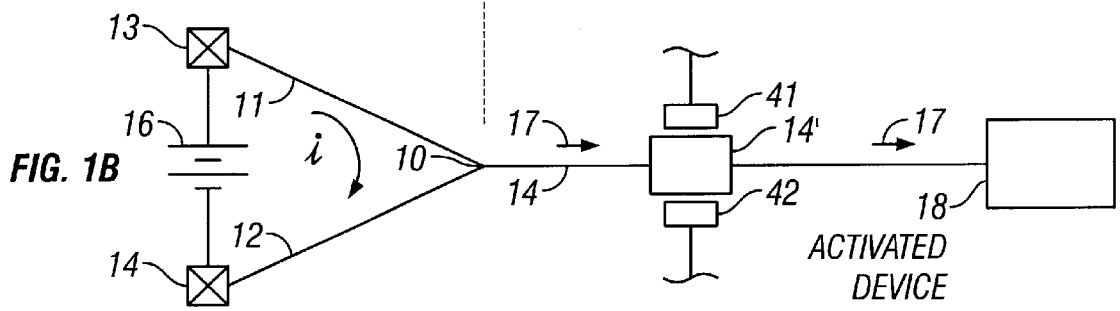
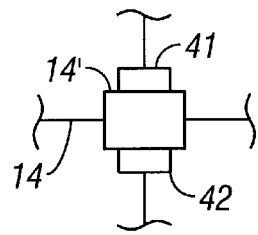
FIG. 1C
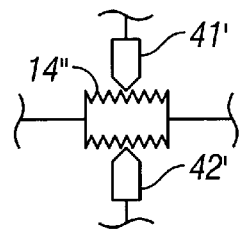
FIG. 1D
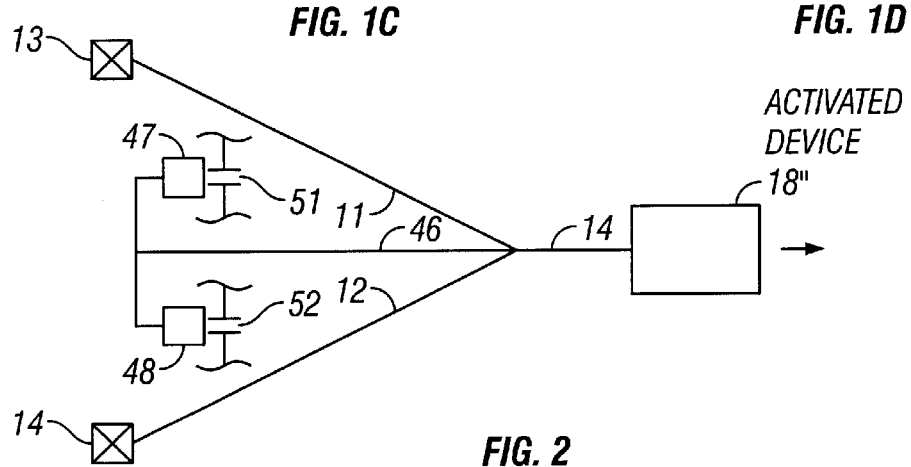
FIG. 2

LATCHING MECHANISM FOR MEMS ACTUATOR AND METHOD OF FABRICATION

The present invention is directed to a latching mechanism for a MEMS actuator and a method of fabrication.

BACKGROUND OF THE INVENTION

Microelectromechanical systems (MEMS) have the potential to dramatically impact the fiber optic telecommunication industry (for example, in the control of switching mirrors used in N×N matrix switches) and also for other functional elements such as variable attenuators and tunable filters. The scalability of micromachined elements makes MEMS the technology of choice for the above applications. For implementing the foregoing, electro-thermal in-plane actuators constructed using the MEMS technology are described in a paper entitled, "Bent Beam Electro-Thermal Actuators for High Force Applications" by Long Que (a co-inventor of this application), et al. in a conference paper published in January of 1999 by the IEEE at the University of Wisconsin. This will be described below. Such actuators comprise a pair of beams meeting at an apex which upon application of a drive voltage expand to provide a rectilinear high force. Removal of the drive voltage of course returns the actuator to its original position. Thus, a necessary feature is a latch so the actuator will retain its position in the event of a power interruption. This allows the communication system to predict the state of the network during a power failure. In other words, a "fail-safe" mode of operation is required.

OBJECT AND SUMMARY OF INVENTION

It is therefore an object of the present invention to provide a latching mechanism for a MEMS actuator and a method of fabrication.

In accordance with the above object, there is provided a latching mechanism for a micro-electromechanical system (MEMS) actuator for applications including actuated devices in photonic switches, variable attenuators or tunable filters, including a thermal actuator having a pair of bent beams fabricated by the MEMS technique of semiconductive material for providing a beam junction, the beam junction having an actuator arm connected to the actuated device, the beam junction and arm having a rectilinear displacement motion for moving the actuated device by application of a drive voltage to the beams from a power supply, with the arm being moved from a non-actuated to an actuated position. A latching mechanism comprises latching means for maintaining the arm and actuated device in the actuated position even while a power supply interruption occurs, the latching means including at least a pair of clamps, actuated by bent beam actuators, juxtaposed on opposite sides of a portion of the arms. The clamps have a normally closed position in the absence of the drive voltage for stopping the arm motion and an open position upon an application of a drive voltage to the bent beams to allow the arm motion.

BRIEF DESCRIPTION OF THE DRAWINGS

FIG. 1A is a simplified plan view of a latching mechanism for an actuator embodying the present invention also illustrating how it would be produced on a semiconductor substrate.

FIG. 1B shows FIG. 1A in an actuated position.

FIG. 1C shows a portion of FIG. 1B in the event of a power failure.

FIG. 1D is an alternative embodiment of FIG. 1C.

FIG. 2 is a simplified schematic plan view of an alternative embodiment of FIG. 1A.

DETAILED DESCRIPTION OF PREFERRED EMBODIMENTS

Figure 3:
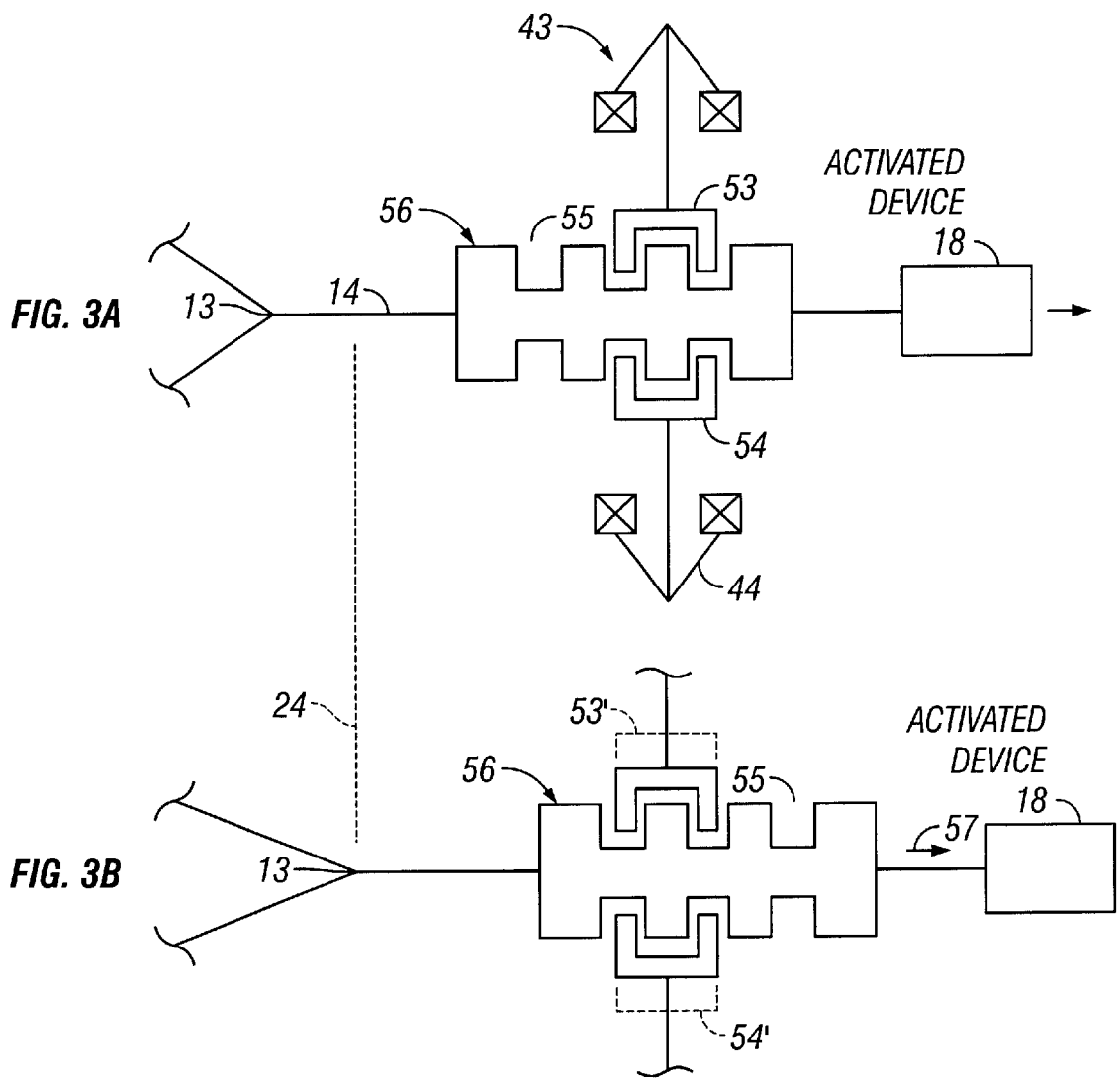
FIG. 3A is a schematic plan view of an alternative embodiment of FIG. 1A.
FIG. 3B shows FIG. 3A in another condition.

FIGS. 1A and 1B illustrate the electro-thermal actuator described in the foregoing Que article which is used in the context of the latching device of the present invention. Referring to both FIGS. 1A and 1B a pair of bent beams 11 and 12 fabricated by MEMS technology on the substrate 10 (which is typically of silicon material) are anchored at 13 and 14. The beams 11 and 12 form an apex at the beam junction 13 to which is coupled an arm 14. A direct current power supply 16 across the beams 11 and 12 causes the current flow, i, producing a thermal stress in the beams 11 and 12 (that is expansion of the beams) to move arm 14 which a force of approximately a milli-newton in the direction as shown by the arrow 17. The other end of beam 14 is coupled to an actuated device 18. Such device will be described in conjunction with FIGS. 4 and 5 below.

Thus, arm 14 has a rectilinear displacement motion which moves the actuated device 18 upon application of the drive voltage 16 to the beams. FIG. 1A shows the actuator in a non-actuated position and FIG. 1B in an actuated position. Thus, the beams 11, 12 and junction 13 and arm 14 are displaced (see dashed line 24) from their home position or non-actuated position by application of a drive voltage and upon removal of the drive voltage or more importantly a power interruption, the restoring forces will return all the elements to home or to "0" position or non-actuated position as illustrated in FIG. 1A. The actuated device 18 may be part of a switching network, for example, an N×N matrix switch using mirrors as for example, shown in FIG. 4, where a power interruption would cause a serious disruption in the switching system. Here the actuated device 18' includes a mirrored surface 21, which may selectively intercept a light beam 22 to direct it from one optical fiber communication line to another. When de-activated or in the event of power interruption, the mirror 21 shifts to its home position 21' as shown by the dashed outlines so that the light beam is no longer interrupted.

Referring again to FIGS. 1A, 1B and also 1C, latching means are provided for maintaining the arm 14 in its actuated position as illustrated in FIG. 1B, even while a power supply interruption occurs. Specifically, the latching means includes a pair of clamps 41, 42 juxtaposed on opposite sides of a portion 14' of arm 14. The clamps are connected in the same manner as the actuated device 18 to a pair of thermal actuators 43 and 44. Here the beams are bent in the opposite direction as beams 11 and 12, so that in the absence of a drive voltage, clamps 41 and 42 are in a normally closed position. This position is with the clamps closely adjacent to arm 14 and also interfering with or stopping the motion the enlarged portion 14' of arm 14. Thus, power is necessary to move the clamps as illustrated in FIG. 1B to a open position where they allow the enlarged portion 14', and thus the arm 14 to move in the direction as shown by the arrow 17. If in this actuated position where the actuated device 18 has been moved as illustrated, a power failure or interruption occurs, then as illustrated in FIG. 1C, the clamps 41 and 42 will attempt to return to their normally closed position illustrated in FIG. 1A, and thus clamp the enlarged portion 14' of arm 14 to maintain it in its actuated position. FIG. 1B illustrates an alternative embodiment of enlarged portion 14" where it is serrated and clamps 41' and 42 are pointed to provide better frictional retention.

Since all of the foregoing latching structure 43, 44 is accomplished by a MEMS technique on the semiconductive substrate 10, the clamps 41 and 42 must be initially fabricated while actuated device 18 is in its non-actuated position, and the clamps 41 and 42 in their normally closed position to be physically in the line of motion of the enlarged portion 14' and to clamp portion 14' in the event of a power interruption. As illustrated in FIG. 1A, from a semiconductive processing point of view, in this MEMS technique of fabrication, the device is a suspended mechanism (that is suspended from the various posts, 13, 14, etc.) the device must be fabricated allowing clearances between the various elements such as between clamps 41 and 42 and the arm 14 and the enlarged portion 14'.

Figure 4:
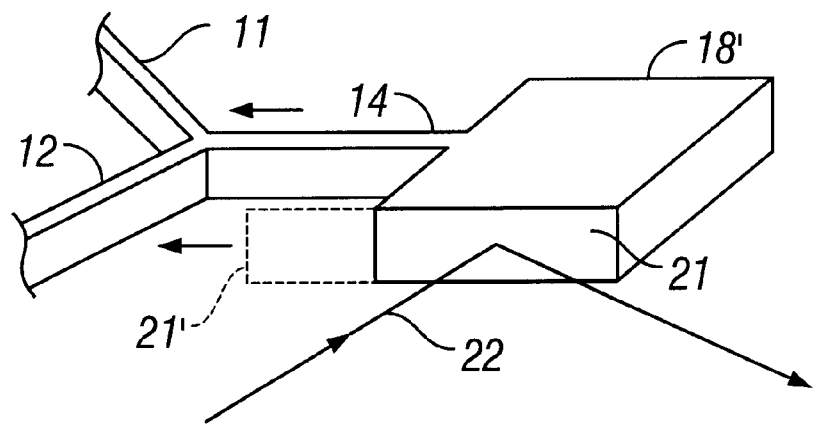
FIG. 4 is a perspective view of an actuated device of the photonic type.

The clamping type of structure as shown in FIGS. 1A and 1B, would be suitable for example for clamping the arm 14 as shown in FIG. 4 where there is clearance between the actuated device and the bent beams 11, 12.

An alternative clamping structure is illustrated in FIG. 2 where an actuated device 18" may have different space requirements. Here a reverse extension of beam 14, 46 includes a pair of enlarged portions 47 and 48 on opposite sides of the arm 46 along with the clamps 51 and 52 which normally interfere with the motion (in the same manner as FIG. 1A), but allow motion when they are moved away from the arm portion to their open position as illustrated in FIG. 1B. And these are also actuated by the bent beam actuators.

FIGS. 3A and 3B illustrate another latching technique where rather than latching by friction, latching occurs by a post and slot technique. The latching mechanism itself is also driven by the inverted bent beam actuators 43 and 44, but have instead a U-shaped structure for clamps 53, 54 which form a pair of posts which are located in the various slots 55 on the enlarged arm portion 56 of arm 14. FIG. 3A illustrates the fabrication mode of the MEMS device, where, as in FIG. 1A, the clamps 53 and 54 are fabricated in a normally closed position but sufficient clearance is allowed for all elements. FIG. 3B shows the actuated position of actuated device 18 where the apex 13 has moved as indicated by the dashed line 24. Thus the enlarged portion 56 with slots 55 has moved to the right as indicated by the arrow 57. To accomplish this movement, the actuators 43 and 44 have been energized to move the clamps to their open positions 53', 54' shown in dashed outline, and then similar to FIG. 1C, if a power interruption or clamping is desired the clamps move into the additional slots 55.

Figure 5:
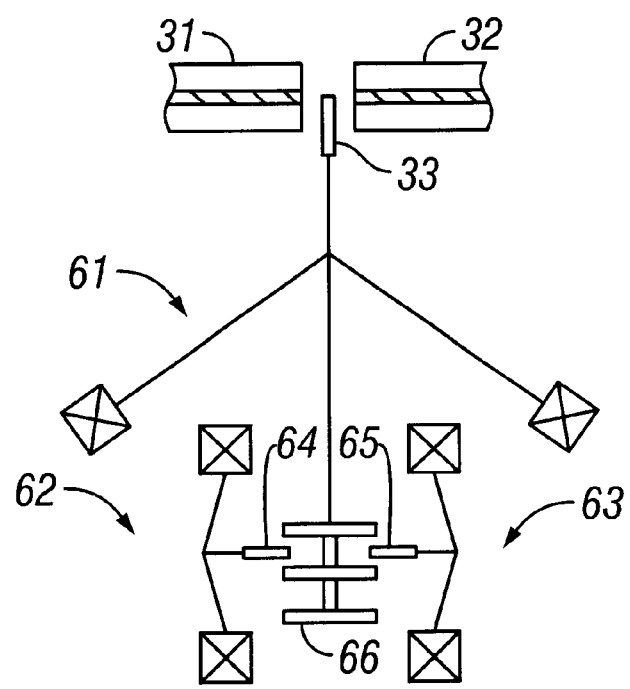
FIG. 5 is an elevation view of an actuated device of an attenuator type.

FIG. 5 is a combination of the post and slot technique of FIG. 3A and the reverse positioning of FIG. 2. A variable optical attenuator for juxtaposed fibers 31, 32 has a interposed attenuator stub 33. It is movable by a first actuator 61, then second and third actuators 62, 63 provide latching with posts 64, 65 and slots 66.

Thus, in summary, a thermal based system effectively latches or retains a displaced MEMS element in the event of a power failure to retain system memory.

What is claimed is:

1. A latching mechanism for a micro-electromechanical system (MEMS) actuator for applications including actuated devices in photonic switches or variable attenuators, including a thermal actuator having a pair of bent beams fabricated by said MEMS technique of semiconductive material for providing a beam junction, said beam junction having an actuator arm connected to said actuated device, said beam junction and arm having a rectilinear displacement motion for moving said actuated device by application of a drive voltage to said beams from a power supply, said arm being moved from a non-actuated to an actuated position, said latching mechanism comprising:

latching means for maintaining said arm and actuated device in said actuated position even while a power supply interruption occurs, said latching means including at least a pair of clamps, actuated by bent beam actuators, juxtaposed on opposite sides of a portion of said arm, said clamps having a normally closed position in the absence of said drive voltage for stopping said arm motion and an open position upon an application of a drive voltage to said bent beams to allow said arm motion.

2. A latching mechanism as in claim 1 where said clamps with said arm in said non-actuated position clamp a portion of said actuating arm and with said arm in said actuated position, moves away from said arm portion to an open position to allow movement.

3. A latching mechanism as in claim 2 where said clamping is by friction on said arm portion.

4. A latching mechanism as in claim 2 where said clamping is by the use of posts or clamps and slots in said arm portions and where said posts are inserted in said slots.

5. A latching mechanism as in claim 1 where said clamps are fabricated by said MEMS technique on the same substrate as said bent beams of said actuator.

6. A latching mechanism as in claim 5 where clamping is by friction and said clamps are fabricated to interfere with the motion of said arm portion which has been enlarged so that said clamps interfere with the motion, but said clamps may be actuated to allow passage of said enlarged portion.

7. A latching mechanism as in claim 5 where clamping is by the use of posts and slots and where said clamps are fabricated with said posts inserted in said slots while said arm is in said non-actuated position and said clamps are in said normally closed position.

* * * * *